E. F. DREGER & F. E. PFISTER.
RIM FOR MOUNTING PNEUMATIC TIRES.
APPLICATION FILED MAR. 2, 1912.
1,080,814.                                    Patented Dec. 9, 1913.
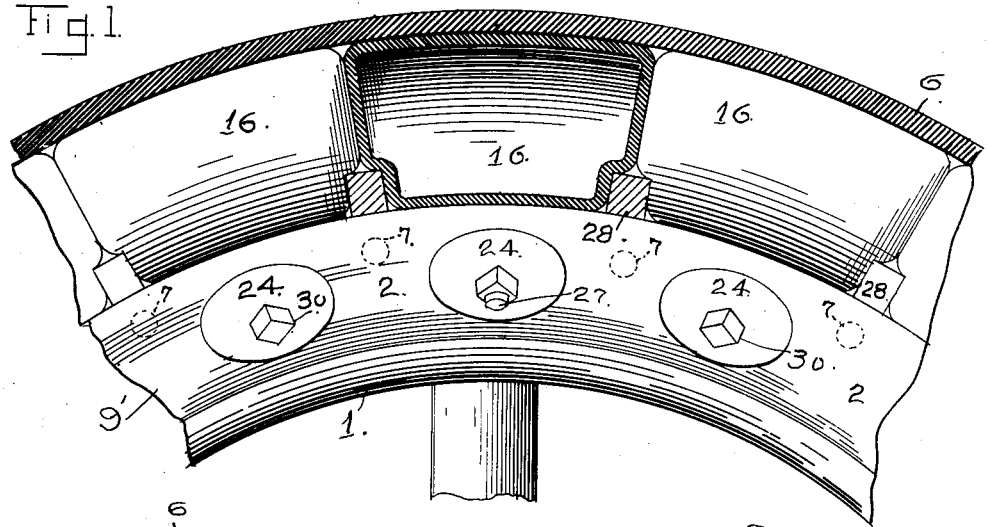
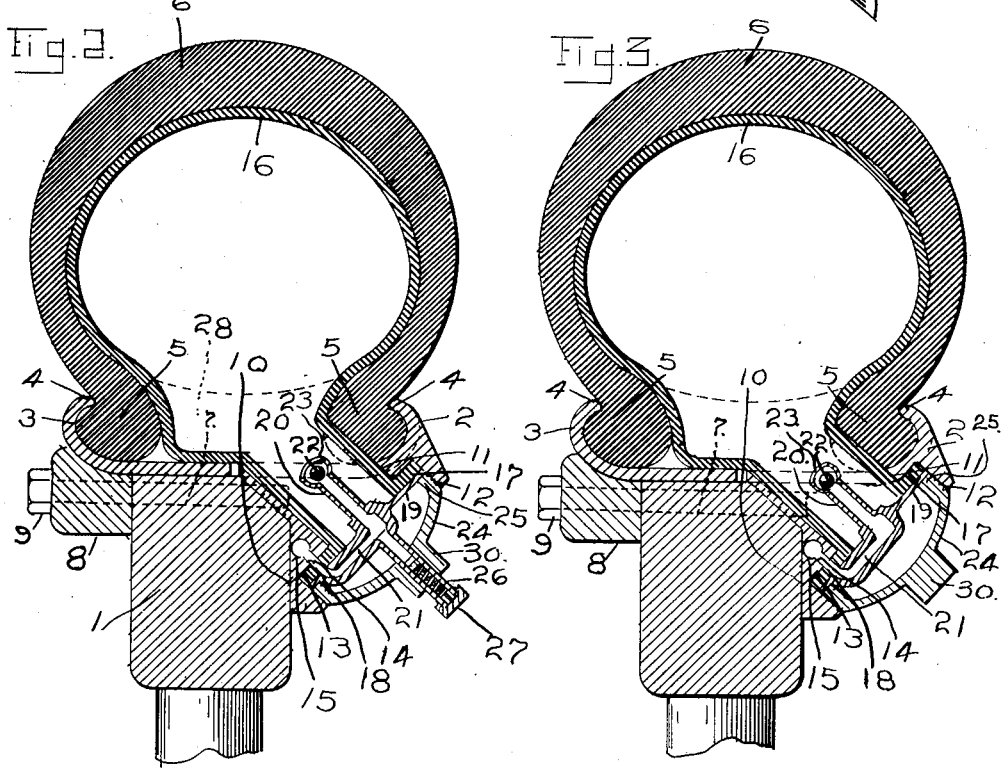
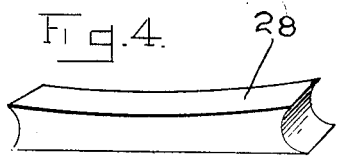

UNITED STATES PATENT OFFICE.

EDWARD FREDERICK DREGER, OF OAKLAND, AND FRANK ELVIN PFISTER, OF PIEDMONT, CALIFORNIA.

RIM FOR MOUNTING PNEUMATIC TIRES.

1,080,814.

Specification of Letters Patent. Patented Dec. 9, 1913.

Application filed March 2, 1912. Serial No. 681,053.

*To all whom it may concern:*

Be it known that we, EDWARD F. DREGER and FRANK E. PFISTER, citizens of the United States, residing the said DREGER at Oakland and the said PFISTER at Piedmont, county of Alameda, and State of California, have invented certain new and useful Improvements in Rims for Mounting Pneumatic Tires, of which the following is a specification.

The hereinafter described invention relates to an improvement in a vehicle rim for mounting pneumatic tires which are formed within an outer clencher casing and a plurality of independently inflatable tube sections therein; and the object of the invention is the production of a rim with suitable apertures in the sides thereof through which the inflatable tube sections are inserted within or withdrawn from the interior of the outer casing, the rim also being provided with a circumferentially arranged bore communicating with each of the tube sections through valved controlled bores or tubes carried by plates adapted to be inserted within the apertures and close the outer end of the tube, the construction providing a common inflating means for all the tubes and at the same time providing against the deflation of the entire tire on a puncture extending within the wall of one of the tube sections.

To comprehend the invention, reference should be had to the accompanying sheet of drawings wherein—
Figure 1 is a longitudinal sectional view of a tire of our improved construction mounted on the supporting rim therefor, disclosing the enlarged annular bead on the side of the rim, an inflating station for the tube sections, and a plurality of stations for the insertion and withdrawal of the tube sections. Fig. 2 is a transverse sectional view of the inflating station, disclosing the valve controlled inflating tube, the valve controlled tube extending within the inflatable tube section, the connection from the inflating tube to the circumferentially arranged bore in the rim, and the manner of securing the inflatable tube section within the rim.
Fig. 3 is a transverse sectional view of one of the tube inserting and withdrawal stations, the construction thereof being the same as the inflating station with the inflating tube removed. Fig. 4 is a perspective view of one of the spreader sections.

In the drawings, the numeral 1 designates a suitable wheel felly of the usual construction provided on its outer surface with an annular metallic rim, divided longitudinally into two sections 2 and 3, each section being provided at its outer edge with the usual upwardly curved inwardly projecting flange 4, for engaging the peripheral beads 5 arranged at each edge of the outer casing 6. The sections 2 and 3 of the metallic rim are detachably secured on the felly 1 by transversely extending bolts 7, the beads of which are countersunk in the outer face of the rim section 2 and the threaded ends thereof adapted to extend through a suitable lug 8 arranged adjacent the felly on the opposite side thereof from the rim section 2, the lug projecting above the felly and adapted to be clamped against the rim section 3 by the nut 9 of the bolt. The rim section 2 is formed below the flange 4 thereof with a suitable annularly extending enlarged bead portion 9' semicircular in cross section and provided with a flat inner face 10 which lies against the side of the felly 1. The enlarged bead 9' is provided at spaced intervals with suitable downwardly inclined cylindrical cut out able portions or bores 11, the upper ends thereof communicating with the interior of the outer casing or tube 6, and the outer ends of which are enlarged as at 12, forming a seat or flange 13 between the larger and smaller portions of the bore. Communicating with each of the enlarged portions 12 of the bores 11 through the seat of the flange 13, are suitable passages 14, the inner ends of which connect with an annular duct or channel 15 arranged circumferentially around the interior of the rim section 2 adjacent the flat inner face 10 thereof.

Each inflatable section of the tire comprises a rubber bulb or tube section 16, one of which is adapted to be inserted into the outer casing through each of the cylindrical bores 11, the open end of the tube being formed with an annular flange 17 adapted when inserted into the bore 11 to rest on the seat 13 and said flange being provided with a small opening 18 adapted to register with the duct 14. A cylindrical disk 19 of a size of the enlarged bore 12 is placed over the open end of the inflatable tube section 16, closing the same, and rests against the annular flange 17 thereof. The disk is provided with an open ended tube 20 projecting from the inner face thereof a short distance into the inflatable tube section and the other end communicates through a channel 21 in the disk 19 with the annular duct or channel 15 arranged in the rim. The end of the tube 20 projecting within the inflatable tube section 16 is provided with any suitable inwardly opening valve, the one disclosed in the drawings being merely for illustration, and consists of a ball 22 confined within an enlarged spherical head 23.

From the above construction it will be observed that each of the inflatable tube sections are in communication with the annular duct 15 for receiving air therefrom, but the valve in the tube 20 closes as the air contained in the inflatable sections attempts to escape therefrom into the duct 15.

The disks 19 are held within the enlarged bore 12 by a suitable cap 24 provided with an annular flange 25, the external edge of which is screw-threaded and said threads are adapted to engage corresponding threads on the interior of the enlarged bore 12, and as the cap is tightly screwed into the bore the inner edge of the flange 25 will press against the disk 19 and clamp the same and the annular flange 17 of the inflatable tube section against each other to prevent the escape of the air confined in the inflatable tube section to the atmosphere.

The air to inflate the several inflatable members is forced into the tire by any suitable pump through an inflating station, disclosed more fully in Fig. 2 of the drawings. The inflating station is similar in construction to the other stations except a suitable valve controlled filling stem 26 is provided on the disk 19, said stem 26 extending from the disk 19 in an opposite direction to tube 20, and is in communication with the tube 20 and channel 21 at the junction thereof. The cap 24 which closes the filling station is provided with a suitable opening in the outer surface thereof through which the inflating tube projects, the end of the inflating tube being provided with a suitable dust cap 27.

The outer casing is provided between each of the tube sections 16 with a suitable spreader 28 provided with grooved ends 29 and which extends transversely of the rim sections 2 and 3 engaging the lower inner edge of the outer casing, forcing the beads thereof into engagement with the engaging flanges 4.

Inasmuch as each of the inflatable sections is in communication with the others through the annular duct 15, it is only required that the air pump be connected to the inflating stem 26, for as air is forced therethrough under pressure the same will flow into each of the inflatable sections and passing through the tube 20 thereof will successively unseat the ball valves 22 and entering the inflatable section will inflate the same to completely fill the outer casing until the back pressure therein is sufficient to seat the valve 22 controlling the admission of air into the inflatable sections, the overflow from one section flowing into the other section.

In the present device the series of simultaneously inflatable sections may be inflated at a single operation, the air pump being connected to the inflating stem for this purpose. In case of a puncture of any one of the inflatable sections, the same may be quickly removed from within the outer casing by unscrewing the cap 24 therefor and withdrawing the deflated section, and a new one inserted within the outer casing through the bore 11, after which the tube is inflated in the manner described, any excess air pressure finding its way into such of the inflated sections of the series as may require the restoring of lost air.

The caps 24 are provided on their outer faces with suitable squared projections 30 which facilitate in removing or applying the same to the openings.

Having thus described the invention what is claimed as new and desired to protect by Letters Patent is—

1. In combination with an outer casing having a series of simultaneously inflatable tube sections therein, of a rim for mounting the same, said rim being divided longitudinally into sections, means for clamping said sections together, one of said rim sections being provided with a plurality of circumferentially disposed openings communicating with the interior of said outer casing for the insertion of the tube sections therein, a valve controlled closure for each of said tube sections, said rim section being further provided with an annular bore therein communicating with each of said valve controlled closures, an inflating valve common to all of said inflatable tube sections, and means for retaining said valve controlled closures in said tube sections.

2. In combination with an outer casing having a series of simultaneously inflatable circumferentially disposed inflatable tube sections therein, of a rim for mounting the same, said rim being provided with a plurality of circumferentially disposed openings therein communicating with the interior of said outer casing for the insertion of the tube sections therein, said rim being further provided with an annular bore arranged circumferentially thereof and communicating with each of said openings, a disk adapted to be seated in each of said openings and close the open end of said tubes, a valve controlled channel in said disk and communicating with said annular bore and said inflatable tube sections, an inflating valve extended from one of said disks and communicating with each of said inflatable sections through said annular bore and means for retaining said disk in said openings.

3. In combination with an outer casing having a series of simultaneously inflatable, circumferentially disposed tube sections therein, of a rim for mounting the same, said rim being provided with a plurality of circumferentially disposed openings therein communicating with the interior of said outer casing for the insertion of said tube sections therein, one of said tubes being seated within each of said openings and capable of withdrawal from said outer casing through said openings, a valve containing closure for each of said tube sections, said closure seating said tube sections within said openings, said rim being further provided with a communicating duct between each of said valve controlled closures and an inflating valve common to all of said inflatable tube sections.

4. In combination with an outer casing having a series of simultaneously inflatable circumferentially disposed tube sections therein, of a rim for mounting the same, said rim being provided with a plurality of circumferentially disposed openings therein communicating with the interior of said casing for the insertion of said tube sections therein, said rim being provided with an annular bore arranged circumferentially therein, said bore communicating with each of said openings, a disk adapted to close the open end of each of said tubes and retain the same in said openings, an inwardly opening valved channel formed in said disk and communicating with said tube and said annular bore, a cap for securely clamping said disk in said opening and providing a closure for the outer end of said opening, and an inflating valve common to all of said inflatable tube sections.

5. In combination with an outer casing having a plurality of circumferentially disposed simultaneously inflatable tube sections therein, of a rim for mounting the same, an enlarged annular bead on one side of said rim, said rim being provided with a plurality of downwardly inclined circumferentially disposed cylindrical openings extending through said enlarged annular bead and communicating with the interior of said casing for the insertion of said tube sections therein, said openings being enlarged adjacent their outer ends to form annular shoulders, said rim being further provided with an annular bore arranged circumferentially thereof and communicating with each of said openings at the shoulders thereof, disks adapted to close the outer end of said tubes and seat the edges of said tubes against said shoulders, a valved channel in said disks and communicating with said tube and said annular bore, a cap for inserting into the outer end of said openings, said cap adapted to clamp said disk to said tube and provide a closure for the outer end of said openings, and an inflating valve projecting outwardly from one of said valved channels and extending through a suitable aperture in one of said caps, said valve being common to all of said inflatable tubes.

6. A rim for the mounting of an outer casing, having a series of simultaneously inflatable tube sections therein, said rim being divided longitudinally into sections, means for clamping said sections together, one of said sections being provided with a plurality of circumferentially disposed openings therein for the insertion of inflatable tube sections, said rim section being further provided with an annular bore arranged circumferentially thereof and communicating with each of the said insertion openings, an established communication from said bore with the interior of each of said inflatable tube sections, and means for closing said insertion openings.

In testimony whereof we have signed our names to this specification in the presence of two subscribing witnesses.

EDWARD FREDERICK DREGER.
    FRANK ELVIN PFISTER.

Witnesses:
 H. F. TOTTEN,
 D. B. RICHARDS.